No. 810,764. PATENTED JAN. 23, 1906.
E. H. HOLLINGSHEAD & C. P. JENNINGS.
PIPE CUTTER.
APPLICATION FILED APR. 24, 1905.

Attest:
CS Middleton
Edward N Sexton

Inventors.
E. H. Hollingshead.
Charles P. Jennings.
By Spear, Middleton, Donaldson & Spear
Attys.

UNITED STATES PATENT OFFICE.

EDWARD H. HOLLINGSHEAD AND CHARLES P. JENNINGS, OF BRADFORD, PENNSYLVANIA.

PIPE-CUTTER.

No. 810,764.  Specification of Letters Patent.  Patented Jan. 23, 1906.

Application filed April 24, 1905. Serial No. 257,236.

*To all whom it may concern:*

Be it known that we, EDWARD H. HOL-LINGSHEAD and CHARLES P. JENNINGS, citizens of the United States, residing at Bradford, Pennsylvania, have invented certain new and useful Improvements in Pipe-Cutters, of which the following is a specification.

Our invention relates to improvements in pipe-cutters, and is particularly designed for cutting nipples. Its object is a pipe-cutter with which nipples of any desired length can be cut from pipes of varying diameters with rapidity and ease and which will not bur up the ends of the pipe, but will make a clean smooth cut.

With these objects in view the invention consists of the construction hereinafter described, and more particularly pointed out in the claims.

Figure 1:
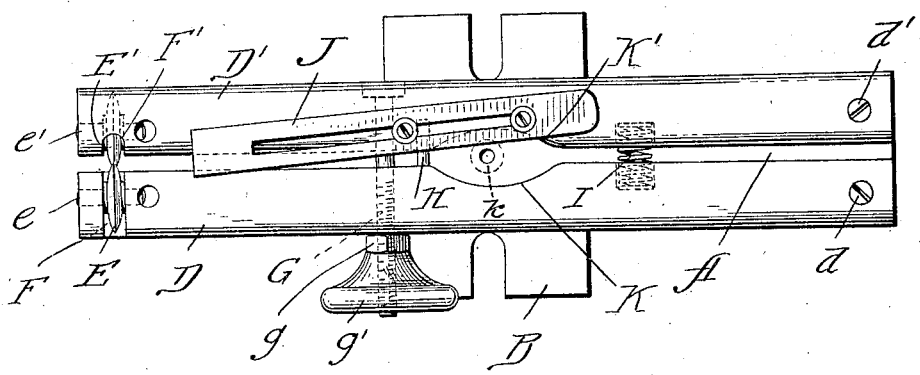
Figure 2:
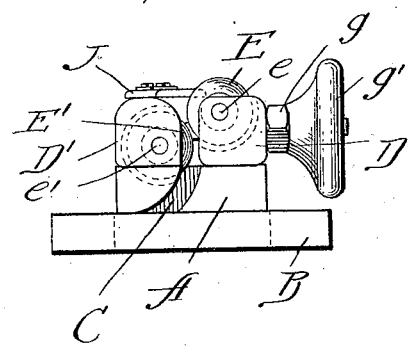

Referring to the accompanying drawings, Figure 1 is a top plan view of our device. Fig. 2 is an end view of the same.

In the preferred construction of our invention we provide a suitable base-plate A, which may be secured to the lathe-carriage or pipe-machine by any suitable means, such as the slotted plate B. The forward end of the base-plate A is slotted, and this slot is preferably segmental in form, as shown at C, and is of sufficient width to receive any pipe which it may be desirable to cut.

Mounted on the base-plate A are the two cutter-arms D D', which are spaced a short distance apart and are pivoted at one end to the base-plate by means of the bolts $d$ $d'$. The rotary cutters E E' are mounted on the pins $e$ $e'$ in recesses F F' near the free ends of the cutter-arms. The rotary cutter E is mounted at a slightly higher level than the cutter E' in order that their cutting edges may be directly opposite one another during the operation of cutting the pipe.

A threaded bolt G, firmly held in the cutter-arm D', passes loosely through the cutter-arm D and is provided on its outer end with a nut $g$, having a hand-wheel $g'$ or other means for operating it to gradually bring the cutters closer together while the pipe is being cut. A stop H is placed between the cutter-arms to prevent the cutters from coming in actual contact with one another, while a spring I tends to force the arms apart when the nut $g$ is moved outward. An adjustable gage J is secured to one of the cutter-arms to regulate the length of pipe to be cut. This gage may be of any suitable form; but that shown in the drawings is simple and easily adjusted.

In their normal position the cutter-arms are so located that the space between them is directly above the slot in the base-plate A; but owing to their being pivoted at $d$ $d'$ they are permitted to swing to either side sufficiently to accommodate themselves to any irregularities in the pipe. While it is desirable that the base-plate A extend to the ends of the cutter-arms, it is not necessary that it should do so, as the device will operate if the base-plate is cut off at a considerable distance from the ends of the cutter-arms and these allowed to project over the same. If desired, the rotary cutter may be omitted from the cutter-arm D', which passes into the pipe, and the cutter-arm used as a mandrel against which the cutter E operates. The cutter-arms D D' may be recessed, as at K K', to permit the manipulation of a bolt $k$ (shown in dotted lines) when such a bolt is used to secure the device to the machine or other support.

In operating the device the gage J is set at the proper distance from the cutters and the nut $g$ is moved outward to allow the cutters to separate far enough to admit the edge of the pipe between them. The pipe is then passed over the cutter-arm D' until it reaches the gage and is then revolved in any suitable manner, and as the pipe revolves the nut is tightened to bring the cutters together as they cut through the pipe. When the pipe has been cut through, the nut $g$ is released and the nipple removed.

The cutters on this machine, being one external and the other internal, cut each half way through the metal, while with single-cutter machines, after the cutter is about half way through the metal it then has a larger and larger body of metal to cut and crowd endwise, which takes time and is hard on the cutters and tends to bur up the ends of the pipe or nipple. Our machine cuts them evenly—that is, the cutter on the outside and the cutter on the inside adjust themselves to the irregular motion or oval shape of the pipe, so that the pipe around its full circumference is being cut at an even depth all the time— while with many other machines, and especially with a single-cutter wheel or tool, the pipe is cut through on one side before it is on the other, and then the tool often breaks.

With our machine, when the pipe is cut off it is beveled from both the inside and outside toward the center of the metal, thus leaving the pipe with a beveled end which is not burred, and needs no rimming or clampering in order to have it easy to start to cut the thread on the end of the nipple or pipe. Furthermore, this beveled end of the nipple or pipe protects the thread of the pipe when the pipe is dropped down endwise or is struck on the end by any object.

Having described our invention, what we claim is—

1. A pipe-cutter comprising a pair of non-rotatable cutter-arms pivoted to a suitable fixed support, cutters mounted on said cutter-arms and means for causing said cutters to approach one to the other, substantially as described.

2. A pipe-cutter comprising two parallel non-rotatable cutter-arms pivoted to a suitable fixed support, rotary cutters mounted on said cutter-arms and means for causing said cutters to approach one to the other, substantially as described.

3. A pipe-cutter comprising a base-plate, cutter-arms secured to said base-plate and parallel thereto, means for securing said base-plate to a fixed support, cutters mounted on said cutter-arms and means for causing said cutters to approach one to the other, substantially as described.

4. A pipe-cutter comprising a stationary base-plate, non-rotatable cutter-arms pivoted to said base-plate, cutters mounted in said cutter-arms and means for causing said cutters to approach one to the other, substantially as described.

5. A pipe-cutter comprising a base-plate having a longitudinal slot in one end thereof, cutter-arms mounted on said base-plate and parallel thereto, cutters carried by said cutter-arms and means for causing said cutters to approach one to the other, substantially as described.

6. A pipe-cutter comprising a base-plate having a segmental slot in one end thereof, cutter-arms mounted on said base-plate, cutters carried by said cutter-arms and means for causing said cutters to approach one to the other, substantially as described.

7. A pipe-cutter comprising a fixed base-plate having a slot therein, cutter-arms pivoted to said said base-plate, cutters carried by said cutter-arms and means for causing said cutters to approach one to the other, substantially as described.

8. A pipe-cutter comprising a base-plate having a longitudinal slot in one end thereof, said slot extending diagonally to the perpendicular of said base-plate, cutter-arms, and means for causing said cutters to approach one to the other.

9. A pipe-cutter comprising a base-plate, a pair of cutter-arms located in the same horizontal plane and mounted on said base-plate, cutters carried by said cutter-arms, said cutters having their axes located in a plane different from that of said cutter-arms, and means for causing said cutters to approach one to the other, substantially as described.

10. A pipe-cutter comprising a base-plate, cutter-arms mounted thereon, cutters carried by said cutter-arms, said cutters having their axes located in a plane diagonal to the plane of said cutter-arms, and means for causing said cutters to approach one to the other, substantially as described.

11. A pipe-cutter comprising a base-plate having a slot therein, cutter-arms mounted on said base-plate and parallel thereto, said cutter-arms being separated by a space, said space being in alinement with said slot, cutters carried by said cutter-arms and means for causing said cutters to approach one to the other, substantially as described.

12. In a pipe-cutter, the combination with the base-plate of cutter-arms parallel thereto, each of said arms being pivoted at one end to said base-plate, cutters mounted in the opposite ends of said cutter-arms and means intermediate the ends thereof for causing said cutters to approach one to the other, substantially as described.

13. A pipe-cutter comprising a base-plate, cutter-arms pivoted to said base-plate, cutters carried thereby, a bolt extending through said cutter-arms and adapted to draw the same together, and a hand-operated nut on the outer end of said bolt.

14. In a pipe-cutter, the combination with the cutter-arms and the cutters carried thereby, of a bolt rigidly held in one of said arms and passing loosely through the other and a nut on the outer end of said bolt, substantially as described.

15. In a pipe-cutter, the combination with the base-plate, the cutter-arms and the cutters, of a bolt passing through said cutter-arms and adapted to draw the same together and a spring adapted to force said arms apart, substantially as described.

16. In a pipe-cutter, the combination with the base-plate, the cutter-arms and the cutters, of a bolt passing through said arms, a spring located between said arms and a stop limiting the movement thereof, substantially as described.

17. In a pipe-cutter, the combination with the base-plate, the cutter-arms and the cutters, of means for drawing said arms together and a gage carried by one of said arms, substantially as described.

In testimony whereof we affix our signatures in presence of two witnesses.

EDWARD H. HOLLINGSHEAD.
CHARLES P. JENNINGS.

Witnesses:
EDWIN E. TAIT,
MARY J. TAIT.